(12) United States Patent
Socci et al.

(10) Patent No.: US 10,259,614 B2
(45) Date of Patent: Apr. 16, 2019

(54) CUSTOM GRAPHIC FILM

(71) Applicant: PepsiCo, Inc., Purchase, NY (US)

(72) Inventors: Edward Peter Socci, Stewartsville, NJ (US); Wenny Wingping-Ng Noha, Vernon Hills, IL (US); Subhankar Chatterjee, Hampton, NJ (US); Mikhail Laksin, Boonton, NJ (US); Prasad K. Adhikari, Carlstadt, NJ (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 15/143,096

(22) Filed: Apr. 29, 2016

(65) Prior Publication Data

US 2017/0313472 A1 Nov. 2, 2017

(51) Int. Cl.
*B65D 23/08* (2006.01)
*B32B 27/06* (2006.01)

(52) U.S. Cl.
CPC .......... *B65D 23/0842* (2013.01); *B32B 27/06* (2013.01); *B32B 2307/41* (2013.01); *B32B 2307/412* (2013.01); *B32B 2323/10* (2013.01); *B32B 2519/00* (2013.01); *B65D 2203/12* (2013.01)

(58) Field of Classification Search
CPC . B65D 25/0842; B32B 37/06; B32B 2307/41; B32B 2307/412; B32B 2323/10; B32B 2319/00
USPC ...................................................... 206/459.5
See application file for complete search history.

(56) References Cited

U.S. PATENT DOCUMENTS

| | | | | |
|---|---|---|---|---|
| 2,648,924 A | * | 8/1953 | Brewster | G09F 3/02 156/247 |
| 3,431,131 A | | 3/1969 | Hartman | |
| 3,512,273 A | * | 5/1970 | Baker, Jr. | G09B 11/04 101/465 |
| 3,753,841 A | * | 8/1973 | Wheeler | B41M 5/124 428/41.6 |
| 3,884,505 A | | 5/1975 | Miller | |
| 4,276,334 A | * | 6/1981 | Sugihara | B41M 5/124 283/114 |
| 5,775,914 A | * | 7/1998 | Smith | B43L 1/002 434/84 |
| 5,855,083 A | * | 1/1999 | Bilbie | B43L 1/123 40/615 |
| 7,594,348 B2 | * | 9/2009 | Oosterlinck | G09F 3/0289 229/102 |
| 8,075,982 B2 | * | 12/2011 | Donahue | A63H 33/38 362/602 |
| 8,989,673 B2 | | 3/2015 | Sandy | |

(Continued)

OTHER PUBLICATIONS

International Search Report and Written Opinion for International Application No. PCT/US2017/029116, dated Jul. 17, 2017, 8 pages.

*Primary Examiner* — Chun Cheung
(74) *Attorney, Agent, or Firm* — Sterne, Kessler, Goldstein & Fox P.L.L.C.

(57) ABSTRACT

A product, system, and method for creating a film capable of allowing a user to create a custom graphical representation is described, which may allow a user to create a custom graphical representation in a film by depressing select areas of the film to form the custom graphical representation.

20 Claims, 7 Drawing Sheets

(56) References Cited

U.S. PATENT DOCUMENTS

| | | | |
|---|---|---|---|
| 2002/0096875 A1* | 7/2002 | Bilbie | B43L 1/123 |
| | | | 283/102 |
| 2003/0093933 A1 | 5/2003 | Bilbie et al. | |
| 2009/0172990 A1* | 7/2009 | Corey | G09F 3/02 |
| | | | 40/675 |
| 2015/0153315 A1 | 6/2015 | Taylor | |
| 2015/0221242 A1* | 8/2015 | Cable | G09F 3/04 |
| | | | 40/661.01 |

* cited by examiner

CUSTOM GRAPHIC FILM

BACKGROUND

Consumers may desire to create custom graphics and convey information on surfaces, such as surfaces of beverage containers.

SUMMARY

A film is disclosed. The film may be used on a label for consumer goods such as a bottle. The film may include a background layer, an upper layer, and a movable material layer disposed between the background layer and the upper layer. The movable material of the movable material layer may move from a first location relative to the background layer to a second location relative to the background layer in response to a force applied to the first layer and the movable material may remain in the second location after the force is removed from the first layer. Upper layer and background layer may form a pouch containing movable material layer.

The label may further include a lower layer under the background layer. The background layer and the moveable material layer may be different colors or different degrees of translucency (e.g., opaque, transparent, or in between) and the movable material layer may be disposed over less than 25% of the surface area of the label. The movable material layer may move to visually expose the background layer in response to an applied force. The movable material may be a water-based polymer or other polymers or combinations of polymers. The upper layer may be transparent and may be a biaxially oriented polypropylene film so the contrast between the movable material layer and the background layer may be more visible.

BRIEF DESCRIPTION OF THE FIGURES

The accompanying drawings, which are incorporated herein and form a part of the specification, illustrate embodiments of the present invention by way of example, and not by way of limitation. Together with the description they further serve to explain principles of the invention and enable a person skilled in the pertinent art to make and use the invention.

DETAILED DESCRIPTION

The present invention will now be described in detail with reference to embodiments thereof as illustrated in the accompanying drawings. References to "one embodiment," "an embodiment," "an example embodiment," "some embodiments," etc., indicate that the embodiment described may include a particular feature, structure, or characteristic, but every embodiment may not necessarily include that particular feature, structure, or characteristic. Similarly, other embodiments may include additional features, structures, or characteristics. Moreover, such phrases are not necessarily referring to the same embodiment. When a particular feature, structure, or characteristic is described in connection with the embodiment, it is submitted that it is within the knowledge of one skilled in the art to effect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

The systems and methods described herein may be used to produce a film capable of displaying a user customized graphic. More particularly, these systems and methods describe a multiple layer film. The film may include a writeable layer for a consumer to create a custom graphic in the film.

Films may be applied to a wide variety of product packaging to create durable and effective labels. Such films may be formed of, for example, polyvinyl chloride (PVC), polyethylene terephthalate (PET), or polylactic acid (PLA). Films may also be used to create an entire package or container. Examples of film labels include wraps around beverage containers or candy wrappers. Films used to create containers may include snack pouches or beverage pouches. Films may include printed layers to display messages or graphics. The graphics may be used to identify a beverage or a brand.

The inventors of the invention described herein have recognized the need for a new product, system, and method of customizing a graphical representation on product packaging, including beverage containers. For example, at social gatherings or sporting events, guests or participants may use beverage containers. The beverage containers may be, for example, cans, bottles, flasks, cups, mugs, or other container types. Additionally, the beverage containers may be designed for single use or may be reusable. These beverage containers may also be made of a variety of materials including, but not limited to, glass, metal, aluminum, or plastics. Many commercial beverage containers, such as bottled waters, sodas, energy drinks, juices, or electrolyte sports drinks have similar or identical packaging and when used by many people at the same location, such as a team sporting event or social function, the beverage containers can be mixed up leading to confusion about which beverage container belongs to which person. For example, at a social function, a host may purchase several dozen beverages for guests, or at a sporting event a coach may purchase a case of beverages for the participants. Identical beverage containers may lead to confusion over which beverage container belongs to which person. A person who has selected a beverage but subsequently loses track of it may not have confidence that the beverage they subsequently pick up belongs to them. This confusion may cause a person to dispose of their beverage container out of concerns that the beverage container may not belong to them. This increases both beverage product waste and beverage container waste because a person may unnecessarily dispose of their own beverage container, simply due to a lack of confidence that it is theirs.

To avoid this confusion, a person may wish to personalize their beverage container (e.g., on its label). For example, a person may mark their beverage container using a permanent marker. While this method may reduce confusion among people with similar-looking beverage containers, it has drawbacks. For example, if two people mark their containers with the same name, distinguishing between the two could be difficult. Also, it requires use of a secondary instrument—a marker—which may not be available. In some cases, adhesive labels may be used to distinguish beverage containers. Adhesive labels may be attached to the exterior of the beverage container. People may write their names or make other distinguishing marks on the label. However, adhesive labels have drawbacks in addition to requiring a secondary instrument to mark the label. Adhesion of labels becomes less effective due to condensation that may develop on the exterior of the beverage container. The effects of condensation or continued contact with the holder's hand may also cause the label to wear and come apart leaving small pieces of the label in the holder's hand. Additionally, in the case where a scratch-away film is applied to a beverage container (allowing a mark to be scratched into the film by removing portions of the film, similar to a scratch off lottery ticket) this, like the adhesive label, leaves undesirable residue and flakes due to the removal of the film material.

The new products, systems, and methods described herein have improved capabilities, thus offering end point consumers, distributors, and producers a greater ability to customize a graphical representation on a consumer good. Further, embodiments of the present invention have reduced production costs and improved health and environmental effects.

The film disclosed herein allows consumers to create custom graphics on a film. The disclosed film may be applied to labels of any shape or contour and may be used with industrial printing equipment. The film may also be applied in a wide variety of shapes to create visually pleasing and space-appropriate custom graphic areas. For example, the custom graphics film may be applied in the shape of a square, circle, rectangle, star, or scroll. The film is flexible enough for consumer use and may be placed on a wide variety of products.

The products, systems, and methods disclosed herein present films used in the context of product labeling for descriptive purposes. However, the disclosed embodiments are not limited to use solely as a label. Some embodiments are described below with reference to the accompanying figures.

Figure 1:
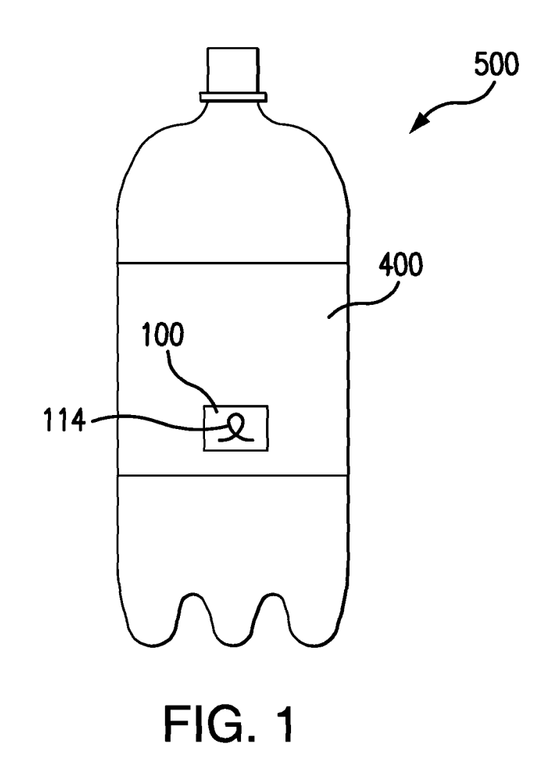
FIG. 1 is an illustration of a film applied to a label of a beverage container according to some embodiments of the present invention.

In some embodiments, a label 400 may be adhered to or attached to a beverage container 500, as shown in FIG. 1. Beverage container 500 may be, for example, a can, bottle, flask, cup, mug, or other variety and may be made of a variety of materials including, but not limited to, glass, metal, aluminum, or plastics. In some embodiments, label 400 may include a film 100 to aid in identifying or otherwise marking the goods. Film 100 may be formed of a material that allows it to be marked and retain a representation of that mark (e.g., to help distinguish it). Label 400 may also be used on various other goods (e.g., individually wrapped snack bars, prepackaged meals, lunch bags, other food storage containers, or toys).

Figure 2:
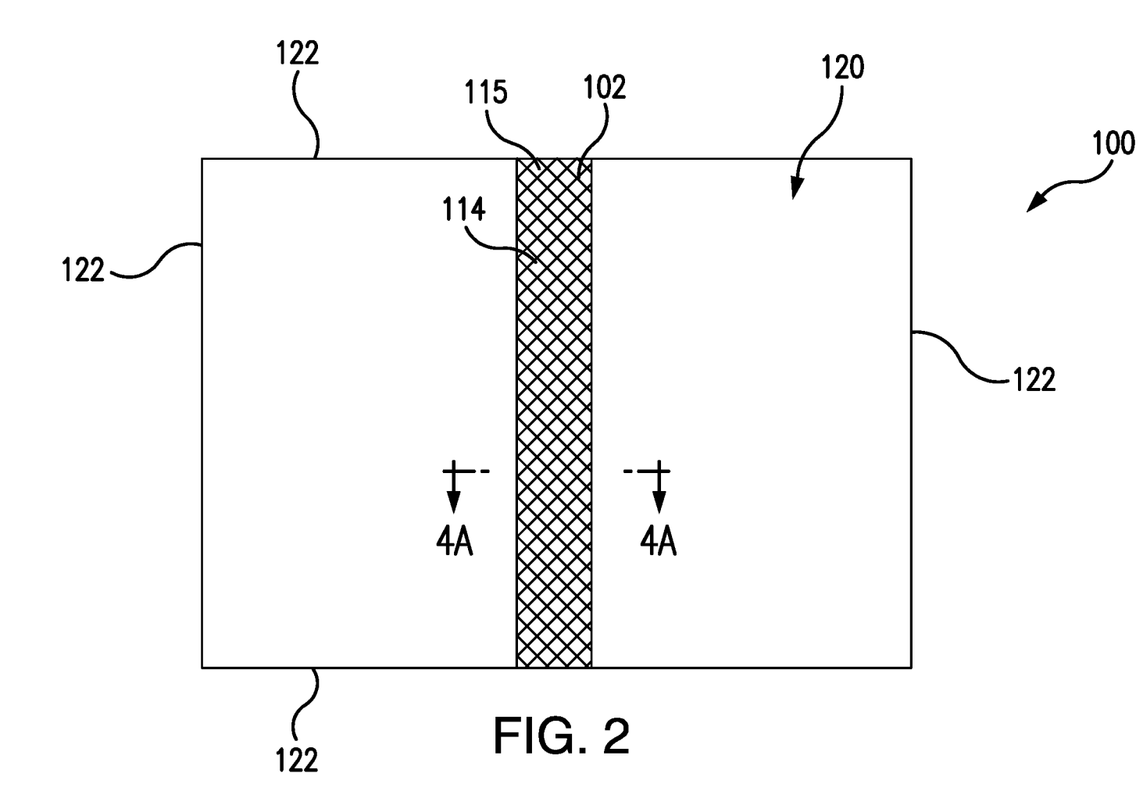
FIG. 2. is an illustration of a film according to some embodiments of the present invention.
Figure 3:
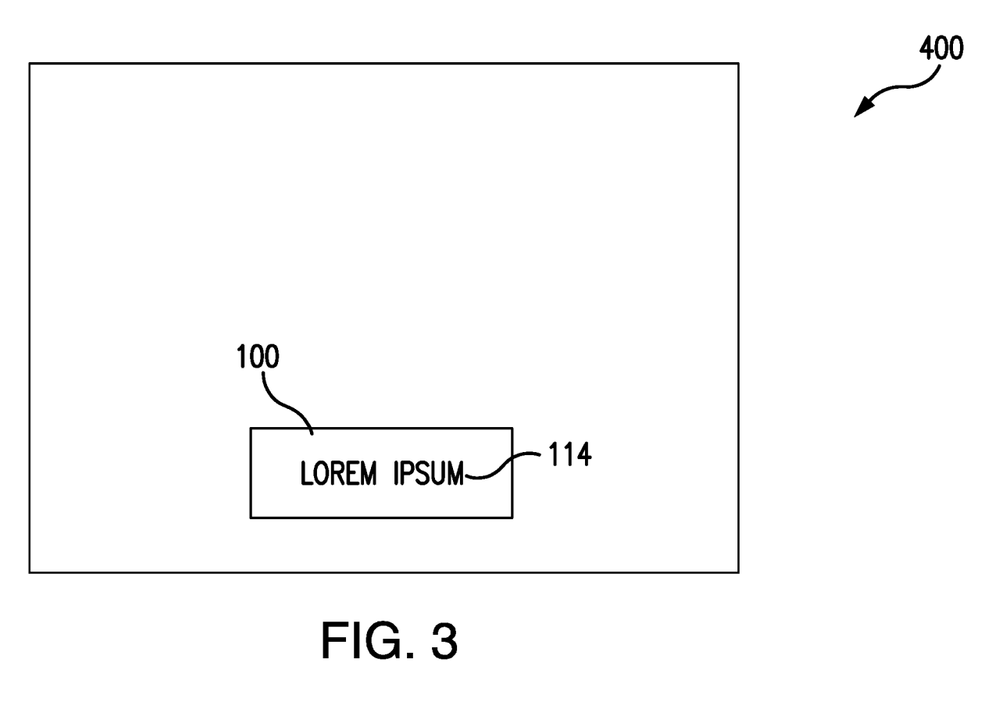
FIG. 3 is an illustration of a film applied to a label according to some embodiments of the present invention.

In some embodiments, a user wishing to display a mark such as custom graphic 114 on a film 100 may form depression 102 in film 100, as shown in FIG. 2. Depression 102 may leave a mark 115 in film 100 forming custom graphic 114. Depression 102, and mark 115 in film 100 created by depression 102, will remain in film 100 until a user deforms film 100 in a way that deforms the original depression 102 to the extent that it is no longer visible (e.g., by applying pressure to the surface of film 100 around the original depression 102 or by creating another depression 102 near the original depression 102). As shown in FIG. 3, in some embodiments film 100 may be applied to a label 400 allowing a user to create a custom graphic 114 on label 400. This configuration may be beneficial in the consumer goods market because film 100 may be applied to only a small area of label 400, thereby allowing companies to continue to brand the majority of label 400 while still giving consumers the ability to customize label 400.

Figure 4A:
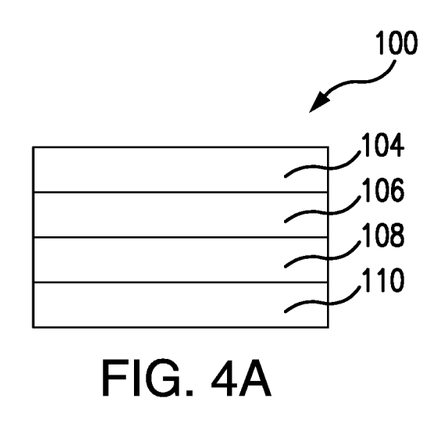
FIGS. 4A-4E illustrate an operation of applying a custom mark to a film according to some embodiments of the present invention.

As shown in FIG. 4A, in some embodiments, film 100 is composed of an upper layer 104, a movable material layer 106, a background layer 108, and a lower layer 110. In some embodiments, upper layer 104 may be a biaxially oriented polypropylene (BOPP) film. In some embodiments upper layer 104 may be a polymeric film between 6 and 50 microns thick, and may be applied to other layers of film 100 by, for example a lamination process. In some embodiments upper layer 104 may be a clear coating or film between 0.5 to 50 microns thick, and may be applied to other layers of film 100 by, for example, a surface printing process. Upper layer 104 may be transparent. In some embodiments it may have a color hue.

Upper layer 104 may enclose movable material layer 106 against background layer 108. Movable material layer 106 may be made of a variety of materials. Movable material layer 106 may be movable within the area beneath upper layer 104. For example, it may be flowable. In some embodiments, for example, movable material layer 106 may be composed of gel that is flowable in response to an applied force, and that retains its position in the absence of an applied force. In some embodiments, movable material layer 106 may be opaque or translucent, so that it obscures background layer 108 over which it is disposed. In some embodiments, movable material layer 106 may have a viscosity between 50 cP (centipoise) and 5000 cP (e.g., between 200 cP and 500 cP).

In some embodiments, background layer 108 and upper layer 104 may be sealed at defined areas to create a pouch 120 for movable material layer 106. Moveable material layer 106 may occupy the pouch and may flow within the pouch. Movable material of movable material layer 106 may be the only substance within pouch 120. Movable material layer 106 may be entirely sealed within pouch. Background layer 108 and upper layer 104 may be sealed at defined areas to create pouch 120, or multiple pouches 120, with different shapes. Pouch 120 may be sealed around its edges 122 formed by the contact between upper layer 104 and background layer 108 to prevent movable material layer 106 from exiting pouch 120. For example, pouch 120 may be formed in the shape of a scroll to give film 100 the shape of a scroll or other visually pleasing shape. A scroll, for example, may reinforce in the user's mind that the film is a custom graphic film on which the user may create custom graphic 114.

In some embodiments, the total thickness of film 100 is between 1 and 20 microns (e.g., between 3 and 10 microns).

Figure 4B:
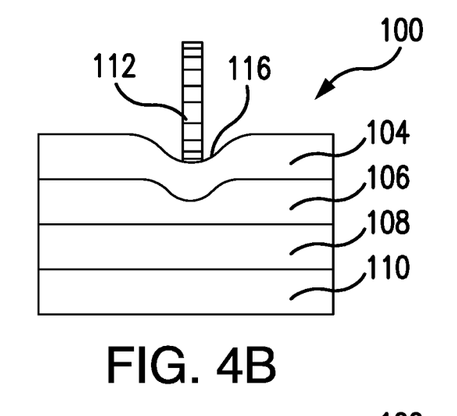
Figure 4C:
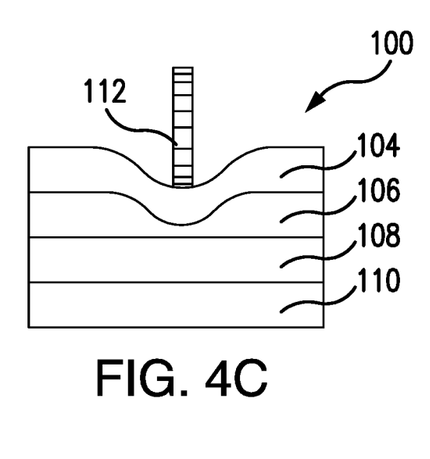
Figure 4D:
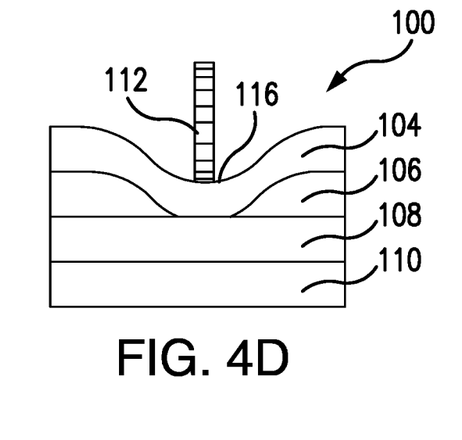

A user wishing to create custom graphic 114 on film 100 may do so with an instrument 112 (see, e.g., FIGS. 4B-4D). Instrument 112 may be a variety of objects. For example, instrument 112 may be, but is not limited to, a coin, credit card, fingernail, writing instrument, stick, or shoelace aglet.

Instrument 112 generally is sufficiently rigid to depress upper layer 104 towards background layer 108 when forced against upper layer 104.

In some embodiments, instrument 112 may apply point pressure to a location 116 on film 100. As instrument 112 is lowered further down into film 100 (i.e., below the original position of upper layer 104), upper layer 104 and movable material layer 106 begin to deform (see, e.g., the sequence of FIGS. 4B-4E in which a coin serving as instrument 112 is forced against upper layer 104 and deeper into film 100, thereby displacing some portion of movable material layer 106). Upper layer 104 remains a cohesive, intact layer with minimal or no compression. Movable material layer 106, in contrast, begins to flow away from instrument 112's applied pressure, that is, away from location 116. Movable material layer 108 may be displaced by point pressure applied to upper layer 104 causing upper layer 104 to move closer to background layer 108. A distributed force (e.g., a non-point force applied by a rounded surface or otherwise distributed over upper layer 104) will generally not be sufficient to displace movable material layer 108. Therefore, objects with narrow edges, such as, for example the tip of a fingernail, which concentrate the force applied into a small area may cause movable material layer to be displaced while a force applied over a larger area of film 100 may not cause movable material layer 108 to be displaced. For example, movable material layer 108 may not be displaced when the hand of the user is pressed against upper layer 104 or when upper layer 104 rubs against another object.

Figure 4E:
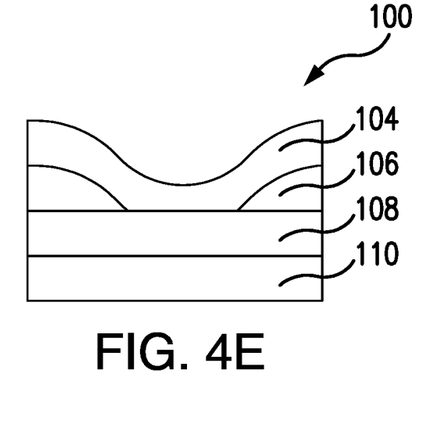
Figure 5A:
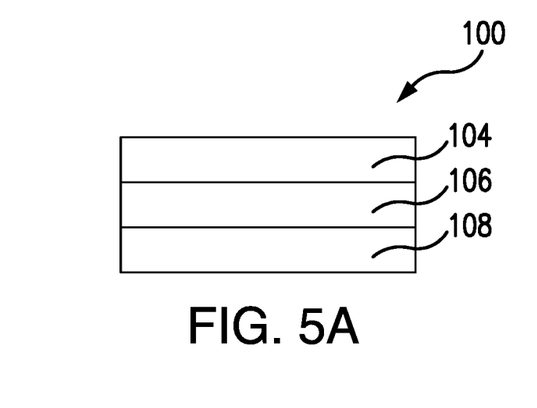
FIGS. 5A-5E illustrate an operation of applying a custom mark to a film according to some embodiments of the present invention.
Figure 5B:
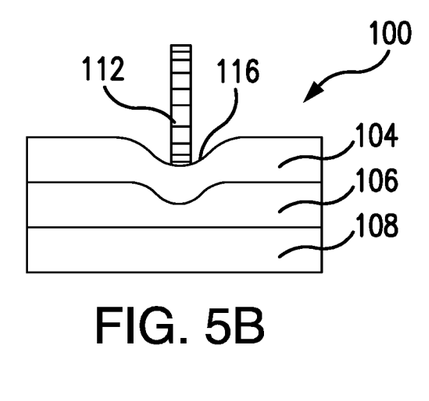
Figure 5C:
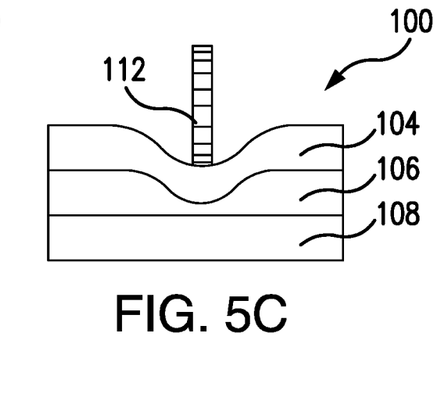
Figure 5D:
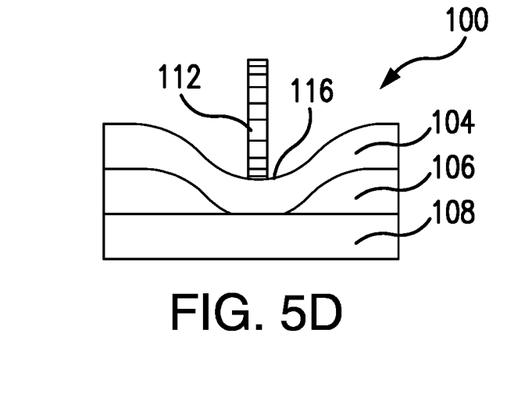
Figure 5E:
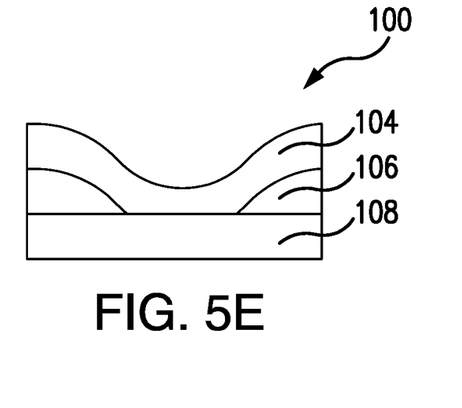

FIG. 4D shows instrument 112 depressing upper layer 114 until it is in contact with background layer 108. Upper layer 114 may or may not make contact with background layer 108. However, as instrument 112 depresses upper layer 104 towards background layer 108, writeable layer 106 flows away from pressure point 116. FIG. 4E presents film 100 after instrument 112 is removed from film 100. As shown in FIG. 4E, writeable layer 106 does not flow back to pressure point 116. Rather, writable layer 106 remains in the same position it was in just before instrument 112 was removed from film 100. That is, movable material layer 106 remains away from pressure point 116. In this way, the portion of background layer 108 at point 116 is visible through upper layer 106 (i.e., it is no longer obscured by movable material layer 106). This creates a visual distinction between pressure point 116 of film 100 (where background layer 108 is visible (or is more clearly visible)) and portions of film 100 where movable material layer 106 is still disposed over background layer 108 (where background layer is not visible (or is less clearly visible). This path (e.g., shape) of this visual distinction is customizable by a user dragging instrument 112 along upper layer 104 to further deform movable material layer 106, thereby creating any desired mark appearing on film 100. Film 100 may also be rewriteable. A user may alter the path of the visual distinction by dragging instrument 112 along upper layer 104 again to further deform movable layer 106 causing mark 114 to change in shape. Moveable layer 106 may move back into an area it previously flowed away from because of further deformation. Thus, portions of film 100 where background layer 108 is visible or is more visible may be obscured or may be more obscured than before by application of pressure that moves material of movable layer 106 back over areas of background layer 108 that it had previously been moved away from. In some embodiments, background layer 108 may be a BOPP film and may include a color or colors. The color or colors of background layer 108 may be different than the color of movable material layer 106 to provide a clear indication of where movable material layer 106 is displaced (e.g., through contrast between the different colors). In some embodiments, upper layer 104 may be clear, movable material layer 106 may be opaque, and background layer 108 may be colored a different color than movable material layer 106. In this way, as a user marks on film 100 spreading writable layer 106, background layer 108 shows through upper layer 104. This combination will make the marks in writable layer 106 more visible to the user.

In some embodiments movable material layer 106 may be a mixture of a resin or emulsion (e.g., a styrene resin) and a coloring agent. In some embodiments movable material layer 106 may be composed of a commercially available water-based polymer combined with an opaque polymer. This combination may allow for clear visual distinction between movable material layer 106 and background layer 108. Additionally, the uses of some water-based polymers may lead to improved printing performance from industrial printers, such that film 100 may be printed on label 400 using a typical industrial printing process. Since labels 400 typically go through such printing processes anyway during their manufacture, this allows the incorporation of film 100 into label 400 without complicating label manufacture by introducing new processes.

In some embodiments, lower layer 110 may be product packaging. Background layer 108 may be applied to lower layer 110 using a printer. Movable material layer 106 may also be applied to background layer 108 using a printer. In this way, minimal changes to existing manufacturing method need to be made to incorporate film 100 because both background layer 108 and movable material layer 106 may be printed directly on product packaging.

In some embodiments, film 100 may include more or fewer layers than those shown in FIGS. 4A-4E. For example, FIGS. 5A-5E show an embodiment of the present invention with three layers. In this embodiment, the three layers are upper layer 104, movable material layer 106, and background layer 108. These layers may have the same characteristics as already described above.

Figure 6A:
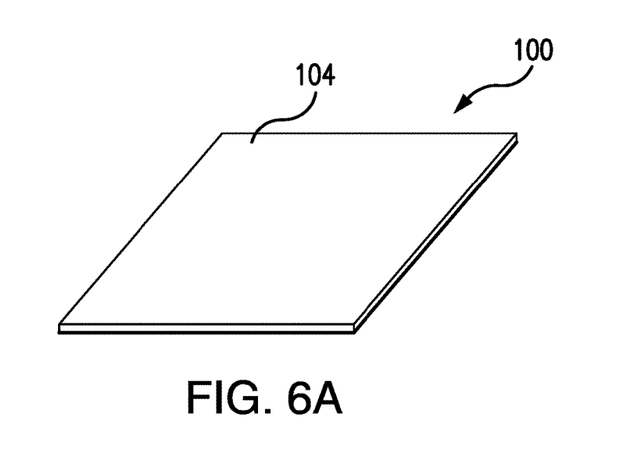
FIGS. 6A-6C illustrate an operation of applying a custom mark to a film according to some embodiments of the present invention.
Figure 6B:
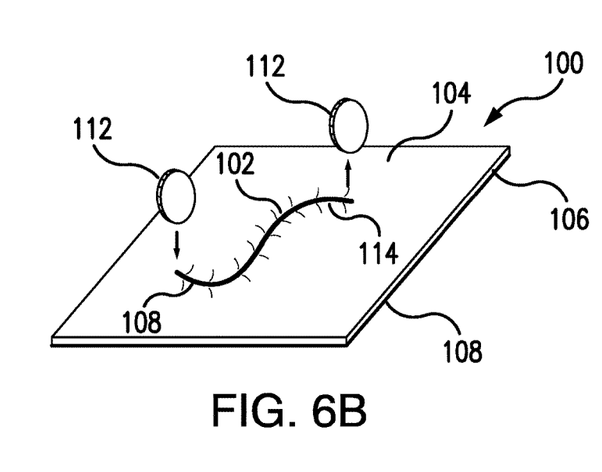
Figure 6C:
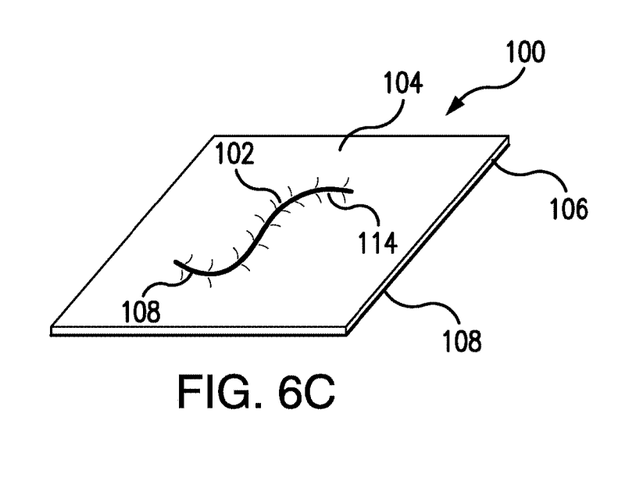

FIG. 6A shows film 100 before custom graphic 114 is added. As shown, movable material layer 106 covers the entirety of film 100. Movable material layer 106 is disposed below upper layer 104, which is clear in this example. Movable material layer 106, on the other hand, is opaque and can be seen under upper layer 104. In FIG. 6B, instrument 112 is moved down into film 100 and in a path along film 100 thereby causing writeable layer 106 to flow away from instrument 112 along the path, which forms custom graphic 114. As noted above, FIGS. 4A-4E show that instrument 112 depresses upper layer 104 through movable material layer 106 until upper layer 104 meets background layer 108. FIG. 6C shows background layer 108 seen through upper layer 104 after instrument 112 is removed from film 100. Movable material layer 106 is shown on either side of the now-visible the background layer 108. In some embodiments, such as is shown in FIG. 6C, custom graphic 114 is formed in film 100 using the contrast between opaque movable material layer 106 and colored background layer 108, both visible through upper layer 104.

Figure 7A:
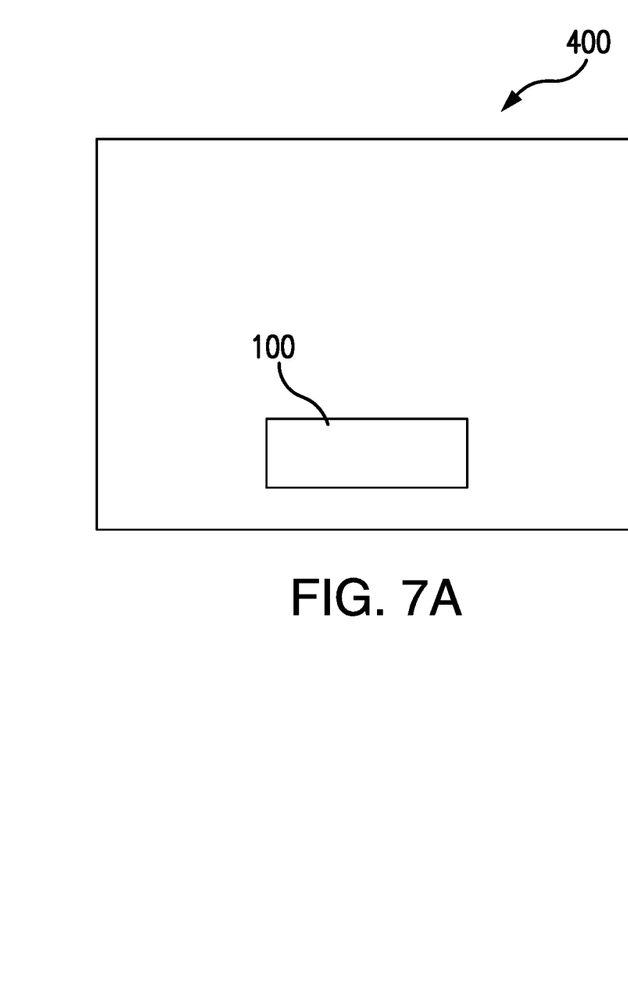
FIGS. 7A and 7B are illustrations of a film applied to a label according to some embodiments of the present invention.
Figure 7B:
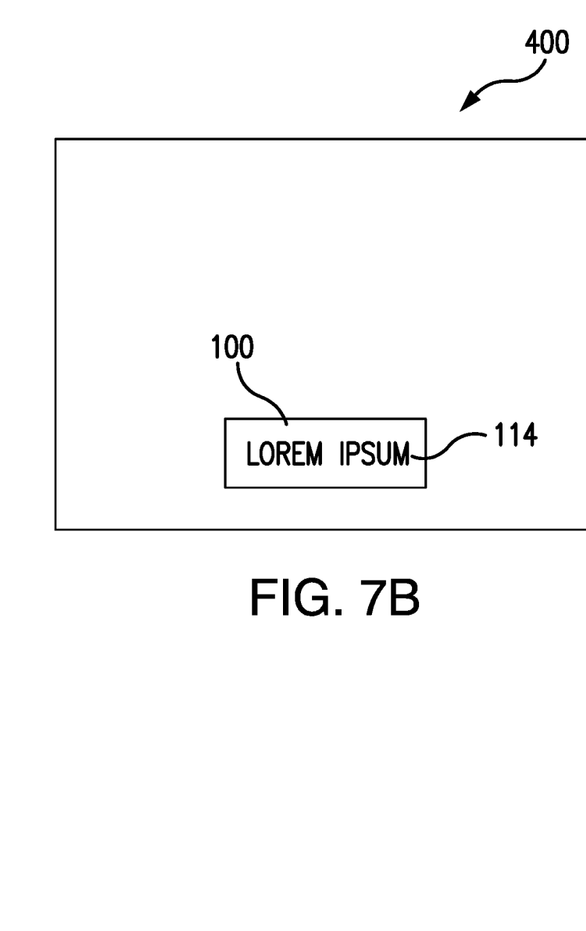

In some embodiments, film 100 may be applied to a packaging label or may be a packaging label. FIGS. 7A and 7B present label 400 with film 100 applied to a select area. Film 100 may occupy, for example, 5%, 10%, 20%, 25%, or 100% of the total area of label 400. Embodiments where film 100 is applied to less than 100% (e.g., less than 25%) of the total area of label 400 allow the remaining area of label 400 to be used for other graphics and text. Film 100 may be applied in many shapes and may be continuous or discontinuous. FIGS. 7A and 7B show film 100 before custom graphic 114 is applied (FIG. 7A) and after custom graphic 114 is applied (FIG. 7B). In some embodiments film 100 may be applied to label 400 using a standard ink print printing process. In some embodiments, lower layer 110 may be a packaging wrap label. An industrial printer may apply background layer 108 to a select area of label 400. The printer may also apply graphics or coloring background layer 108 and to other portions of label 400 where film 100 will not be used. The printer may apply movable material layer 106 to background layer 108. Upper layer 104 may then be applied over movable material layer 104. In some embodiments upper layer 104 may be applied across the entire label 400, which may help to provide a consistent look and feel to the exterior of label 400, and may help to maintain the layers of film 100 in place.

The Detailed Description section is intended to be used to interpret the claims. The Summary and Abstract sections may set forth one or more but not all exemplary embodiments of the present invention as contemplated by the inventors, and thus, are not intended to limit the present invention and the appended claims to those particular embodiments.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A label for a bottle, the label comprising:
    a background layer;
    an upper layer; and
    a movable material layer disposed between the background layer and the upper layer, the movable material layer having a viscosity between 50 cP and 5000 cP,
    wherein movable material of the movable material layer moves from a first location relative to the background layer to a second location relative to the background layer in response to a force applied to the first layer,
    wherein the movable material remains in the second location after the force is removed from the first layer, and
    wherein the moveable material is flowable at the second location.

2. The label of claim 1, further comprising a lower layer disposed under the background layer.

3. The label of claim 1, wherein the background layer is a different color than the movable material.

4. The label of claim 1, wherein the movable material layer is disposed on less than 25 percent of a surface area of the label.

5. The label of claim 1, wherein the movable material flows from the first location to the second location.

6. The label of claim 1, wherein the upper layer is transparent.

7. The label of claim 1, wherein the upper layer is a biaxially oriented polypropylene film.

8. The label of claim 1, wherein the movable material is opaque.

9. The label of claim 1, wherein the movable material comprises polymers.

10. The label of claim 9, wherein the polymers comprise a water-based polymer.

11. The label of claim 1, wherein the background layer and the upper layer form a pouch and wherein the movable material is contained within the pouch.

12. The label of clam 1, wherein the movable material remains between the upper and the lower layer after the application of the force.

13. A bottle comprising the label of claim 1.

14. A container for a consumable good, the container comprising a rewritable film, the film comprising:
    a background layer,
    a movable medium disposed on the background layer, wherein the movable medium is a flowable gel and has a viscosity between 50 cP and 5000 cP,
    wherein the movable medium moves to visually expose the background layer in response to and at the location of an applied force, and
    wherein the movable medium moves to a second location in response to the applied force and remains at the second location when the applied force is removed.

15. The container of claim 14, wherein the movable medium does not separate from the background layer.

16. The label of claim 1, wherein the movable material has a viscosity between 200 cP and 500 cP.

17. The label of claim 1, wherein the thickness of the label is less than 20 microns.

18. The label of claim 1, wherein the movable material is a resin.

19. The container of claim 14, wherein the movable medium is flowable at the second location.

20. A label for a bottle, the label comprising:
    a background layer;
    an upper layer; and
    a movable material layer disposed between the background layer and the upper layer,
    wherein movable material of the movable material layer moves from a first location relative to the background layer to a second location relative to the background layer in response to a force applied to the first layer,
    wherein the movable material remains in the second location after the force is removed from the first layer, and
    wherein the thickness of the label is less than 20 microns.

* * * * *